Nov. 7, 1939.                    W. H. BAUMKER                    2,178,678
                              SADDLE POST ASSEMBLY
                              Filed June 21, 1937
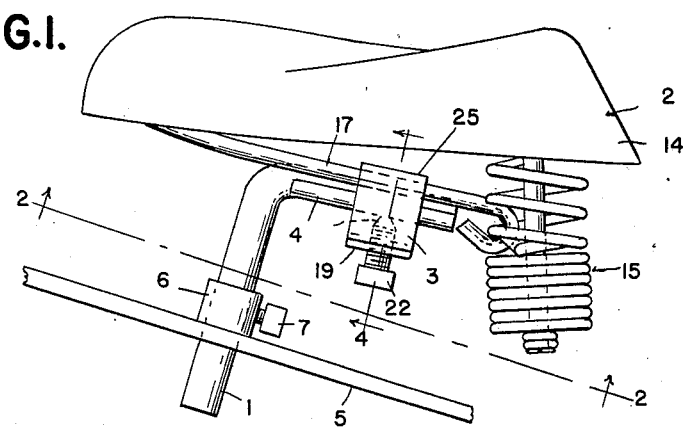
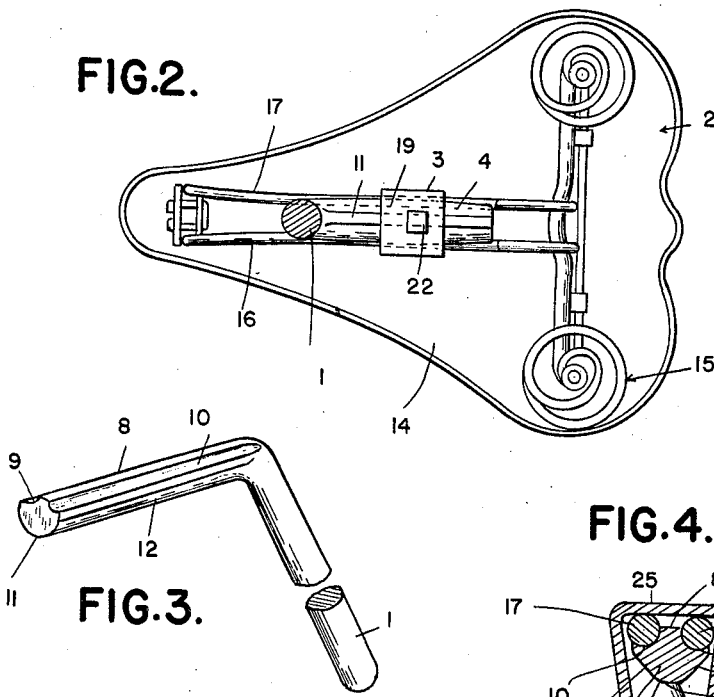
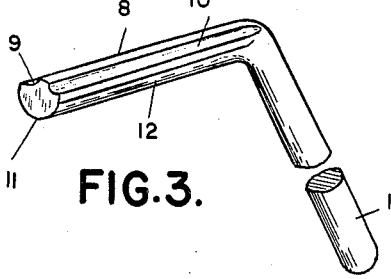
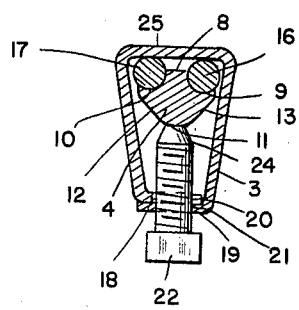
INVENTOR
WILLIAM H. BAUMKER.
BY
ATTORNEYS Patented Nov. 7, 1939

2,178,678

UNITED STATES PATENT OFFICE 2,178,678

SADDLE POST ASSEMBLY

William H. Baumker, Toledo, Ohio, assignor to The American-National Company, Toledo, Ohio, a corporation of Ohio Application June 21, 1937, Serial No. 149,531

7 Claims. (Cl. 155—5.24)

This invention relates generally to saddle post assemblies and refers more particularly to those designed for use in connection with velocipedes and the like.

One of the essential objects of the invention is to provide an assembly of this type wherein provision is made for preventing the saddle from tilting to one side or the other on the supporting arm of the post when in use.

Another object is to provide an assembly wherein the means for preventing the saddle from tilting is constructed so that the saddle may be adjusted lengthwise of the supporting arm.

Another object is to provide an assembly wherein a part of the means for preventing the saddle from tilting is operable to hold the saddle in any adjusted position on the arm.

Another object is to provide a saddle post assembly that is simple in construction and can be manufactured at a comparatively low cost.

Other objects, advantages and novel details of construction of this invention will be made more apparent as this description proceeds, especially when considered in connection with the accompanying drawing, wherein:

Figure 1 is a side elevation of a saddle post assembly embodying my invention and showing a portion of a velocipede backbone to which the assembly is applied;

Figure 2 is a sectional view taken substantially on the line 2—2 of Figure 1;

Figure 3 is a detail perspective view of the supporting post;

Figure 4 is a sectional view taken substantially on the line 4—4 of Figure 1.

Referring now to the drawing, 1 is the post, 2 is the saddle and 3 is the clamp of a saddle post assembly embodying my invention. As shown, the post 1 is substantially cylindrical in form and is provided at its upper end with an arm 4 that preferably extends at substantially right angles thereto. In practice this post 1 may be mounted in any suitable manner upon the backbone 5 of a velocipede or other device and may be held in adjusted position relative thereto by any suitable means. Preferably the post 1 is received in a bushing 6 fixed to the backbone 5 and is held in position by a suitable set screw 7.

In the present instance the metal of the arm 4 is cold swedged to the configuration shown in Figure 3. Preferably this arm 4 in its finished form has a relatively wide, flat upper face 8 provided throughout its length at opposite side edges thereof with longitudinally extending grooves 9 and 10 and has a relatively narrow, flat lower face 11. Opposite sides 12 and 13, respectively, of the arm may be any suitable configuration, but preferably inclined downwardly and inwardly as shown from points adjacent the grooves 9 and 10 to the lower face 11.

The saddle 2 comprises a seat 14 and a spring structure 15 that are conventional in design and are connected together as a unit in the usual manner. As shown, the reach bars 16 and 17, respectively, of the spring structure are substantially parallel and extend longitudinally of the seat beneath the latter so as to engage the grooves 9 and 10 in the arm 4 of the post.

The clamp 3 is substantially rectangular in shape and receives the reach bars 16 and 17 and arm 4. Preferably this clamp 3 is formed of heavy gauge sheet metal and has overlapping flat portions 18 and 19, respectively, at its lower end provided with registering threaded openings 20 and 21. A set screw 22 engages these openings 20 and 21 and has a tapered end 24 engageable with the lower face 11 of the arm 4. Thus, when the parts are assembled, the flat upper end 25 of the clamp bears upon the reach bars 16 and 17 of the saddle spring structure while the set screw 22 bears against the flat lower face 11 of the arm 4. As a result, the bars 16 and 17 will be effectively held in the laterally spaced grooves 9 and 10 in the arm by the upper end 25 of the clamp. Therefore, even though the set screw 22 is not as tight as it should be, the saddle 2 will not be able to tilt on the arm 4. Inasmuch as the grooves 9 and 10 extend throughout the length of the arm 4, the reach bars 16 and 17 of the saddle may be adjusted therein lengthwise of the arm as desired to position the saddle at different points longitudinally of the backbone 5. The clamp 3 and set screw 22 will hold the saddle 2 in any adjusted position.

What I claim as my invention is:

1. In a saddle post assembly, a saddle having substantially parallel reach bars, a supporting post having an arm extending lengthwise of and recessed to receive said reach bars, a clamp of substantially inverted U-configuration straddling the reach bars and arm and provided below the latter in spaced relation thereto with overlapping inturned portions having aligned threaded openings, and a clamping member threadedly engaging the aligned threaded openings and bearing against the underside of said arm.

2. In a saddle post assembly, a saddle having subtsantially parallel reach bars, a supporting post having an arm extending lengthwise of and provided with grooves for receiving the parallel reach bars, and means for clamping the reach bars in said grooves including an inverted substantially U-shaped member straddling the reach bars and arm, said member being formed from sheet stock and provided beneath the arm in spaced relation thereto with overlapping inturned end portions having aligned threaded openings, and an adjustable element threadedly engaging said threaded openings and exerting pressure against the arm.

3. In a saddle post assembly, a saddle having substantially parallel reach bars, a supporting post having an arm extending lengthwise of and provided with grooves for receiving said reach bars, and means for clamping the reach bars in said grooves including a substantially rectangular clamp enveloping the reach bars and arm, the upper end of said clamp resting upon and exerting a pressure against said reach bars, the lower end of said clamp being beneath the arm in spaced relation thereto, and an adjustable element threadedly engaging the lower end of said clamp and exerting a pressure against said arm.

4. In a saddle post assembly, a saddle having a spring structure, a supporting post having an arm forming a seat for said spring structure, a clamp of substantially inverted U-configuration straddling a portion of said spring structure and arm and provided below the latter in spaced relation thereto with overlapping inturned portions having aligned threaded openings, and a clamping member threadedly engaging the aligned threaded openings and bearing against the underside of said arm.

5. In a saddle post assembly, a saddle having a spring structure, a supporting post having an arm carrying said spring structure, an inverted substantially U-shaped member straddling a portion of said spring structure and said arm, said member being formed from sheet stock and provided beneath the arm in spaced relation thereto with overlapping inturned end portions, and an element adjustable in said overlapping end portions and exerting pressure against the underside of said arm.

6. In a saddle post assembly, a saddle having substantially parallel reach bars, a supporting post having an arm extending lengthwise of and forming a seat for said reach bars, and means for clamping the reach bars upon said seat including a substantially rectangular clamp enveloping the reach bars and arm, the upper end of said clamp resting upon and exerting a downward pressure against said reach bars, opposite sides of said clamp being spaced from opposite sides of said arm, the lower end of said clamp being beneath said arm in spaced relation thereto, and adjustable clamping means extending upwardly through the lower end of said clamp and exerting a pressure against the underside of said arm.

7. In a saddle post assembly, a saddle having substantially parallel reach bars, a supporting post having an arm extending lengthwise of and forming a seat for said reach bars, and means for clamping the reach bars upon said seat including an inverted substantially U-shaped member straddling the reach bars and arm, said member being provided beneath the arm in spaced relation thereto with overlapping inturned portions, and clamping means adjustable in said overlapping portions and exerting pressure against the underside of said arm.

WILLIAM H. BAUMKER.